United States Patent

[11] 3,622,331

[72] Inventor Daniel C. Thomas
Covina, Calif.
[21] Appl. No. 835,788
[22] Filed June 23, 1969
[45] Patented Nov. 23, 1971
[73] Assignee Lithoplate, Inc.
Covina, Calif.

[54] POLYCARBONATE-CINNAMATE PHOTOPOLYMER
4 Claims, No Drawings

[52] U.S. Cl. .......... 96/68,
96/35.1, 96/75, 96/86 P, 96/115 R, 260/47 XA
[51] Int. Cl. .......... C08g 17/13
[50] Field of Search .......... 260/47 X;
96/86, 68

[56] References Cited

UNITED STATES PATENTS

| | | | |
|---|---|---|---|
| 3,066,117 | 11/1962 | Thoma et al. | 260/77.5 |
| 3,329,664 | 7/1967 | Tsuda | 260/91.3 |
| 3,475,373 | 10/1969 | Jackson et al. | 260/47 |

OTHER REFERENCES

Shim et al, Chemical Abstracts, Vol. 63 (1965), col. 10119–10120

*Primary Examiner*—Samuel H. Blech
*Attorney*—Owen, Wickersham & Erickson

ABSTRACT: A polycarbonate resin is reacted with a cinnamoylating agent such as cinnamoyl chloride to produce a novel photopolymer, a polycarbonate-cinnamate resin. The photopolymers are useful for making photoresist plates and presensitized negative-working printing plates.

POLYCARBONATE-CINNAMATE PHOTOPOLYMER

This invention relates to a new photopolymer resin which is capable of use in photolithography and in photomechanical processes. It also relates to a method of producing the novel photopolymer.

One object of this invention is to provide an inherently light-sensitive photopolymer for use in the graphic arts and particularly in preparing or forming surface-type lithographic plates and etching resists.

A further object of this invention is to provide a photopolymer which may be applied directly in contact with a metal support member or over a sublayer on such a member.

Yet another object is to provide a photopolymer which may be applied directly to many different types of metal surfaces, such as steel, copper, and aluminum, without producing undesirable effects.

A further object of this invention is to provide a photopolymer which is suitable for a variety of uses in lithographic and photomechanical processes, such as in the production of printed circuits, chemical milling, and etching processes.

An additional object of this invention is to provide a photopolymer which permits the utilization of an automated process in the preparation of printing plates for use in lithographic operation by being capable of being developed by organic solvents.

A further object is to provide a new photopolymer which may be developed by either organic solvents or emulsion developers.

The present invention comprises a polycarbonate-cinnamate which is made by reacting a polycarbonate resin with a cinnamoylating agent such as cinnamoyl chloride in the presence of a solvent and subsequently precipitating the polycarbonate-cinnamate from the solvent.

Polycarbonate resins are often sold under the trademark LEXAN. They make transparent, clear films that are thermoformable, heat sealable, strong, tough, and strain resistant. They also have good solvent resistance and excellent corrosion resistance. The polycarbonate resins used as one of the starting materials for this invention have molecular weights from about 20,000 to about 50,000. The basis for such polycarbonates may be monomeric-bisphenol-A, which is also known as 2,2-bis(4-hydroxy phenyl)propane. These polyaryl carbonates are a special variety of polyesters in which carbonic acid is substituted for the more conventional adipic acid or sebacic acid or phthalic acid, and also a diphenol is substituted for more conventional glycols. Bisphenol-A polycarbonate resins have terminal hydroxyl groups which I have found may be cinnamoylated by the use of any of several presently available cinnamoylating compounds containing the cinnamoyl radical and capable of attaching to the polymer through reaction with hydroxyl groups.

As an example, 12 grams of "LEXAN" Polycarbonate film (8 inches × 10 inches × 7.5 mils thick) is added to 50 cc. of n-methyl-2-pyrrolidone in a 250 ml. beaker, and the mixture is heated for one hour at 115° C., to dissolve the polycarbonate resin. Then, 12 grams of cinnamoyl chloride is added to the dissolved polycarbonate resin and heating continued for 1 hour at 100°–110° C. to effect the reaction, all at atmospheric or ambient pressure. The polycarbonate-cinnamate reaction product is then precipitated and washed in methanol several times to remove cinnamoyl chloride and then dried.

The polycarbonate-cinnamate of this example has been used on ball-grained aluminum plates to make presensitized negative-working polycarbonate-cinnamate photopolymer lithographic printing plates, exposed 10 minutes and developed to give a usable image.

In addition, the polycarbonate-cinnamate photopolymer of this example has been used to make a presensitized negative-working diazo photopolymer plate by overcoating a negative-working diazo plate with polycarbonate-cinnamate photopolymer. The polycarbonate-cinnamate photopolymer has a photospeed somewhat slower than some other photopolymers, but when added to the diazo gave good images with only 10-second to 60-second exposure to a xenon arc lamp.

The polycarbonate-cinnamate photopolymer has also been used successfully to make positive-working diazo-photopolymer plates.

The polycarbonate-cinnamate described above has also been used to make a resist for printed circuit boards. For example, 10 parts by weight of the polycarbonate-cinnamate polymer described above was dissolved in 200 parts by weight of cyclohexanone and one part by weight of Michler's Ketone was added. The solution was applied to a printed circuit board and the solvent evaporated. The board was then dried to remove the residual solvent, thereby giving an unexposed photoresist product.

This plate was then exposed to a xenon arc lamp for 10 minutes at 1,200 foot-candles, through a negative of a printed circuit design desired. The exposed plate was developed by rocking it in xylene to remove the unexposed areas. The exposed insoluble image, after drying, was then used as a resist while etching the plate in a 42° Be′ ferric chloride solution to give the desired printed circuit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. The photopolymeric reaction product of a bisphenol A polycarbonate resin and cinnamoyl chloride, said chloride being added in sufficient amount to cinnamoylate terminal hydroxyl groups of said resin.

2. A method for making polycarbonate-cinnamate photopolymer comprising:
- dissolving bisphenol A polycarbonate resin in a solvent,
- adding cinnamoyl chloride and dissolving it in the solvent, said chloride being added in sufficient amount to cinnamoylate terminal hydroxyl groups of said resin,
- heating the mixture at about 100° to 110° C. to react the polycarbonate with the cinnamoyl chloride and form a photopolymer,
- cooling the mixture, and
- precipitating out the resulting photopolymer from the solvent.

3. A photoresist plate, comprising a chemically etchable base covered with photopolymerizable polycarbonate-cinnamate reaction product of bisphenol A polycarbonate resin and cinnamoyl chloride, said chloride being added in sufficient amount to cinnamoylate terminal hydroxyl groups of said resin.

4. A presensitized negative-working printing plate comprising a negative-working diazo plate having a coating thereover of a reaction product according to claim 1.

* * * * *